(12) United States Patent
Phillips et al.

(10) Patent No.: US 7,487,270 B2
(45) Date of Patent: *Feb. 3, 2009

(54) METHOD AND APPARATUS FOR USING A PERSONAL DIGITAL ASSISTANT TO INTERFACE WITH A COMMUNICATION STATION

(75) Inventors: Daja Phillips, Mountain View, CA (US); Gregory J. Wolff, Redwood City, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,120

(22) Filed: Jan. 17, 2006

(65) Prior Publication Data

US 2006/0117045 A1   Jun. 1, 2006

Related U.S. Application Data

(63) Continuation of application No. 09/531,240, filed on Mar. 21, 2000, now Pat. No. 7,010,635.

(51) Int. Cl.
*G06F 13/12* (2006.01)
*G06F 13/38* (2006.01)
*G06F 3/00* (2006.01)
*G06F 3/023* (2006.01)
*G06F 5/00* (2006.01)
*G06F 15/16* (2006.01)

(52) U.S. Cl. .................. 710/38; 710/1; 710/8; 710/9; 710/11; 710/14; 710/16; 710/62; 710/63; 710/64; 710/65; 710/72; 710/73; 710/74; 710/105; 710/316; 370/351; 370/389; 370/392; 370/401; 370/466; 370/467; 379/88.13; 379/88.14; 709/230; 709/238; 709/250

(58) Field of Classification Search .................. None
See application file for complete search history.

(56) References Cited

U.S. PATENT DOCUMENTS

| 5,497,339 A | 3/1996 | Bernard |
| 5,689,654 A | 11/1997 | Kikinis et al. |
| 5,692,199 A | 11/1997 | Kikinis et al. |

(Continued)

FOREIGN PATENT DOCUMENTS

EP    0 518 595 A2    12/1992

(Continued)

OTHER PUBLICATIONS

Nonfinal Office Action mailed Jan. 26, 2005 for U.S. Appl. No. 09/531,240, 10 pages.

*Primary Examiner*—Tanh Q Nguyen
(74) *Attorney, Agent, or Firm*—Blakely, Sokoloff, Taylor & Zafman LLP

(57) ABSTRACT

A method and apparatus for interfacing a personal digital assistant (PDA) with a communications appliance is provided. The method comprising a communication station receiving semi-structured data from a personal digital assistant (PDA) in a format native to the PDA, and parsing the semi-structured data to identify a type of the semi-structured data. If the semi-structured data is destination data, sending a job to a destination indicated by the semi-structured data.

31 Claims, 5 Drawing Sheets

U.S. PATENT DOCUMENTS

| | | |
|---|---|---|
| 5,704,029 A | 12/1997 | Wright |
| 5,740,230 A | 4/1998 | Vandreuil |
| 5,742,845 A | 4/1998 | Wagner |
| 5,742,905 A | 4/1998 | Pepe et al. |
| 5,805,298 A * | 9/1998 | Ho et al. ............ 358/402 |
| 5,825,353 A | 10/1998 | Will |
| 5,860,023 A | 1/1999 | Tognazzini et al. |
| 6,128,605 A | 10/2000 | Saito et al. |
| 6,163,274 A | 12/2000 | Lindgren |
| 6,412,022 B1 | 6/2002 | Kumpf et al. |
| 6,711,154 B1 * | 3/2004 | O'Neal ............ 370/352 |
| 6,799,211 B1 * | 9/2004 | Bennett et al. ............ 709/224 |
| 2001/0047272 A1 | 11/2001 | Frietas et al. |
| 2001/0049277 A1 | 12/2001 | Meyer et al. |
| 2001/0056504 A1 | 12/2001 | Kuznetsov |
| 2002/0188841 A1 | 12/2002 | Jones et al. |
| 2003/0012156 A1 | 1/2003 | Fukuda |
| 2003/0105821 A1 | 6/2003 | Shah et al. |

FOREIGN PATENT DOCUMENTS

| | | |
|---|---|---|
| WO | WO 98/28892 | 7/1998 |

* cited by examiner

METHOD AND APPARATUS FOR USING A PERSONAL DIGITAL ASSISTANT TO INTERFACE WITH A COMMUNICATION STATION

This is a continuation of application Ser. No. 09/531,240, filed Mar. 21, 2000, now U.S. Pat. No. 7,010,635, entitled "A Method and Apparatus for Using a Personal Digital Assistant to Interface with a Communication Station," incorporated by reference herein and assigned to the corporate assignee of the present invention.

FIELD OF THE INVENTION

The present invention relates to communication stations, and more specifically, to using a personal digital assistant to interface with a communication station.

BACKGROUND

Communication appliances, such as copy machines, fax machines, and telephones, are becoming more user friendly. Communication appliances now often combine the functionalities of copying and faxing. As more functionality is added to communications appliances, the user interface becomes more and more difficult to implement without using cumbersome keyboards.

In the prior art, if a user wished to fax a document, he or she would go to the fax machine, prepare a cover letter by hand or on another device such as a computer, type in the destination telephone number for the fax, and send the fax. This is cumbersome, especially if the fax was to be sent to multiple destinations.

In the prior art, if a user wished to e-mail a document from a communication appliance, the destination e-mail address would have to be entered on a keyboard. Thus, the prior art requires a keyboard for the communication appliance. Adding such a keyboard is cumbersome and inconvenient.

SUMMARY OF THE INVENTION

A method and apparatus for interfacing a personal digital assistant (PDA) with a communications appliance is provided. The method comprises a communication station receiving semi-structured data from a personal digital assistant (PDA) in a format native to the PDA, and parsing the semi-structured data to identify the type of the semi-structured data. If the semi-structured data specifies destination data, sending a job to a destination indicated by the semi-structured data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
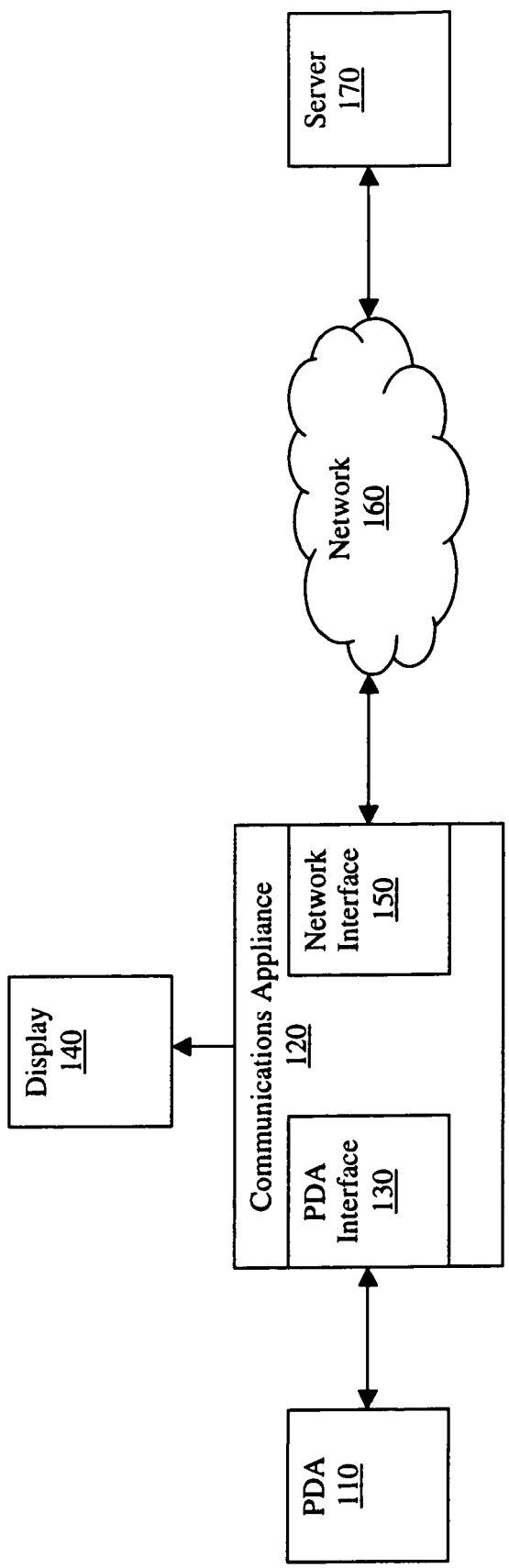
FIG. 1 is a block diagram of one embodiment of a network.

A method and apparatus for interfacing a personal digital assistant (PDA) with a communications appliance is described.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a network. The system includes a personal digital assistant (PDA) 110 which interfaces with communications appliance 120 through PDA interface 130.

The PDA 110 may be any personal digital assistant, such as any of the Palm series by 3COM Corporation, the Cassiopeia by Casio Corporation, or another type of PDA 110. Generally, PDAs 110 store data in proprietary formats. The PDAs 110 can communicate with a computer system, with each other, and with other devices, either by being coupled to the other device by a cable or transmitting information via infrared, radio, or other wireless transmission. The PDA 110 is not modified and transmits its information, whether via cable/socket connection or via beaming, in its native format.

In one embodiment, the interface between the PDA 110 and the communications appliance 120 may be through beamed communication (e.g. infrared), through a direct socket (e.g. inserting the PDA 110 into a socket on the PDA interface 130), or through other mechanisms.

The communications appliance 120 is coupled to a display 140. In one embodiment, the display 140 may be integral with the communications appliance 120. In another embodiment, the display 140 may be integral with the PDA 110. In another embodiment, the display 140 may be a separate display, such as a CRT or LCD display coupled to the communications appliance 120.

The communications appliance 120 may further include a network interface 150. The network interface 150 is designed to couple the communications appliance to a network 160. The network 160 may be a local area network (LAN), wide-area network (WAN), the Internet, or another network. The network 160 is designed to couple the communications appliance 120 to another server 170 or servers.

In one embodiment, the server 170 may be a standard computer coupled to the communications appliance 120. In another embodiment, the server 170 may be a directory server for the network 160 to which the communications appliance 120 is coupled. In another embodiment, the server 170 may be a remote server that serves web pages. The communications appliance 120 may be coupled to any type of server through network 160.

In one embodiment, communications appliance 120 or server 170 may store unique job identification data. This job ID may include all or some of the following data: item sent and destination. The destination may include a location as well as a format. For example, the destination may be E-mail Daja Phillips, dphillips@ricoh.com. This identifies how the item was sent—via e-mail, and to whom—Daja Phillips, and where—her e-mail address, dphillips@ricoh.com.

In one embodiment, this unique job ID may be returned to the PDA, after a job is performed.

Figure 2:
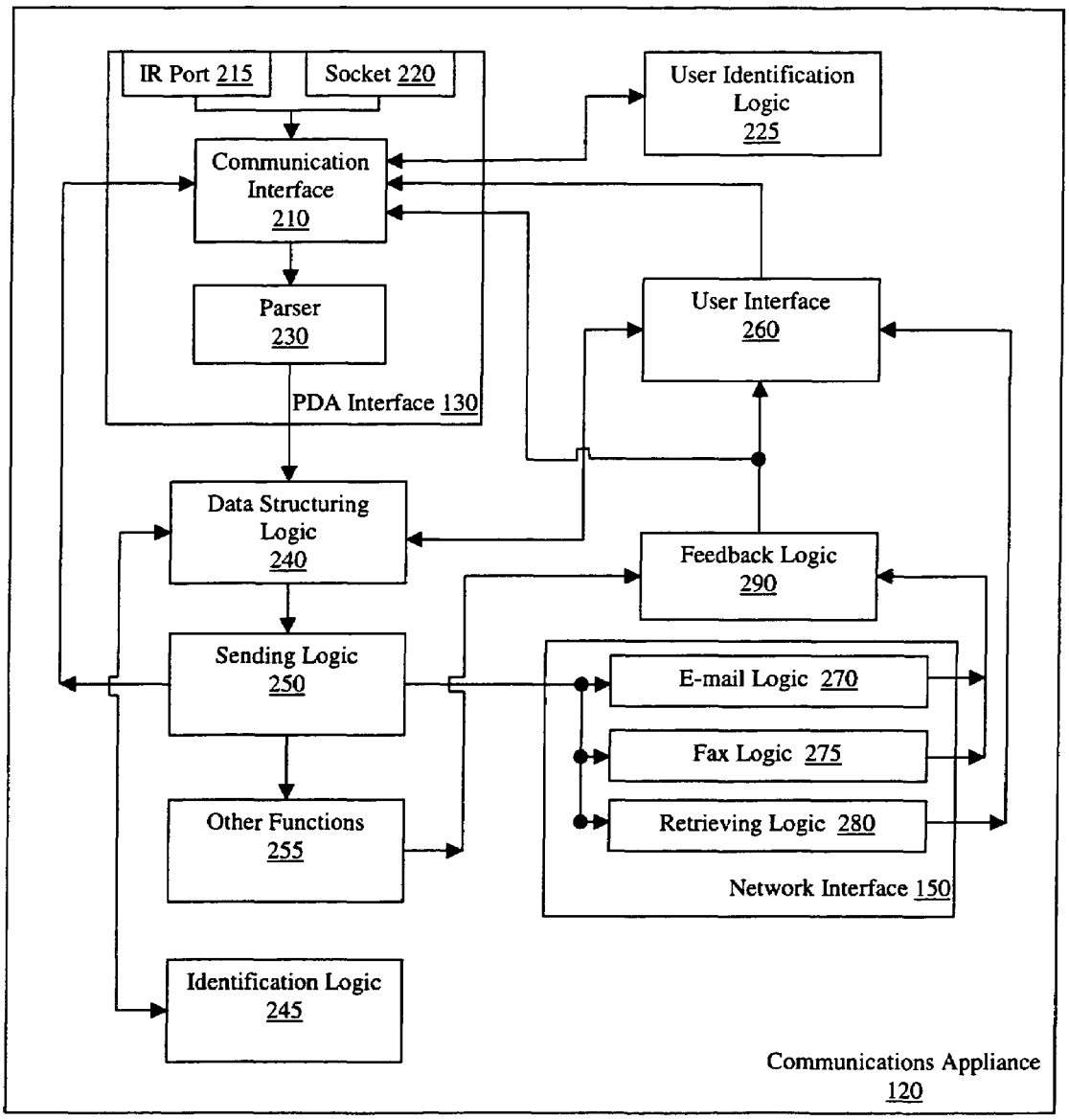
FIG. 2 is a block diagram of one embodiment of a general communications appliance.

FIG. 2 is a block diagram of one embodiment of a communications appliance in which the present invention is implemented. The PDA interface 130 includes a communication interface 210 to receive communications from the PDA (not shown). In one embodiment, the communication interface 210 may include an IR port 215, to receive infrared beamed data from the PDA. The communication interface 210 may include, either in addition to or instead of the IR port 215, a socket 220. The socket 220 may be designed to receive a specific type of PDA, or multiple types of PDAs. Most PDAs interface to a computer system or other system via a socketing mechanism. For example, the Palm series of PDAs include a serial port, which may be coupled to a computer system. In one embodiment, the socket 220 acts a serial port, such that the PDA accepts the communications appliance 120 as a standard computer system, for its interface. In one embodiment, the communication interface 210 may further include the ability to receive wireless communication, or communication on another frequency, as appropriate for the PDAs supported by the communications appliance 120.

The communications interface 210 receives data, sent by the PDA user, in the PDAs native format. The communications interface 210 passes this data on to parser 230.

In one embodiment, along with the data, the system may receive user identification, identifying the user of the PDA. In one embodiment, the user identification logic 225 attempts to determine the identity of the owner of the PDA. This data is passed to identification logic 245.

In one embodiment, if the PDA owner is identified. If it is appropriate, the identification logic 245 may present a job history and/or a contact database to the user, which may include a list of addresses used by the user in previous interactions with any communication appliance connected to the same server/network. In this way, the user may select a destination or reuse data from a job history easily.

The parser 230 determines what type of data was received from the PDA. In one embodiment, the data may be address book data, such as an email address, fax number, or other contact information. The data may also be text, a search request, or a retrieval request (e.g., fetch text from www.ricoh.com.) The parser 230 attaches a file definition to the data received and passes the data to data structuring logic 240. In another embodiment, the parser 230 may identify a job ID number in the data received from the PDA.

Data structuring logic 240 reformats the data received into a format that is understandable by the communications appliance 120. In one embodiment, if the communications appliance 120 can not parse the data, the data structuring logic 240 passes a question on to the user and receives the response from the user via the user interface 260. For example, if multiple destinations are indicated, i.e. the record received includes an email address and a fax number, the user may be prompted to select the destination to which the job should be sent.

The data structuring logic 240 passes the structured information, e.g. data, what data is requested, and/or what destination is selected, to sending logic 250. In one embodiment, data structuring logic 240 sends any job ID information received in the data to identification logic 245. Identification logic 245 retrieves data associated with the job ID, from memory. In one embodiment, the memory may be within communications appliance 120 or may be external, available through a direct connection or a network connection. This job ID data may then be used by user to reprint the document, resend a document, send a new document to the same group of addresses, or for other reasons.

Sending logic 250 receives structured information from data structuring logic 240 and sends the job, as appropriate, to other functions 255, email logic 270, fax logic 275, or retrieving logic 280.

Other functions 255 are functions that do not use the network interface 150. Other functions may, for example, include making photocopies, printing, faxing, or other services. The sending logic 250 sends the appropriate data to other functions 255, which are then performed. Other function logic 255, In one embodiment, then notifies the feedback logic 290 of the success or failure of the operation. The feedback logic 290 may be coupled to user interface 260 to directly display the results, and/or to communication interface 210 to return the data to the PDA from which the operation was initiated.

The network interface 150 permits the communications appliance 120 to communicate via a network. In one embodiment, email logic 270 and fax logic 275 may communicate via this network to send data from the communications appliance 120.

Retrieving logic 280 may be used to retrieve data via the network. The retrieving logic 280 may retrieve data to complete destination information, to fetch a document, or for other reasons. For example, if the data structuring logic 240 indicates that the destination selected by the user is incomplete—such as a name but no email address or fax number—the sending logic 250 may, through the retrieving logic 280, retrieve from a company directory or a white pages, the missing information. Similarly, the user may request that the communications appliance 120 fetch data from a web site or other known address, for printing or sending. This is done through the retrieving logic 280.

Thus, the communications appliance 120 receives information from a PDA, in the PDAs native format, and performs certain actions in response to that information. In one embodiment, this information may be coupled with other information received from the user via user interface 260. The communications appliance 120 can, for example, receive a document from the PDA, and then receive a number of destinations for the document. For example, a user may upload a document, fax it to some users, email it to other users, and print out copies for him or herself. This versatility permits a user to fully utilize the capabilities of a PDA and the communications appliance 120.

Figure 3:
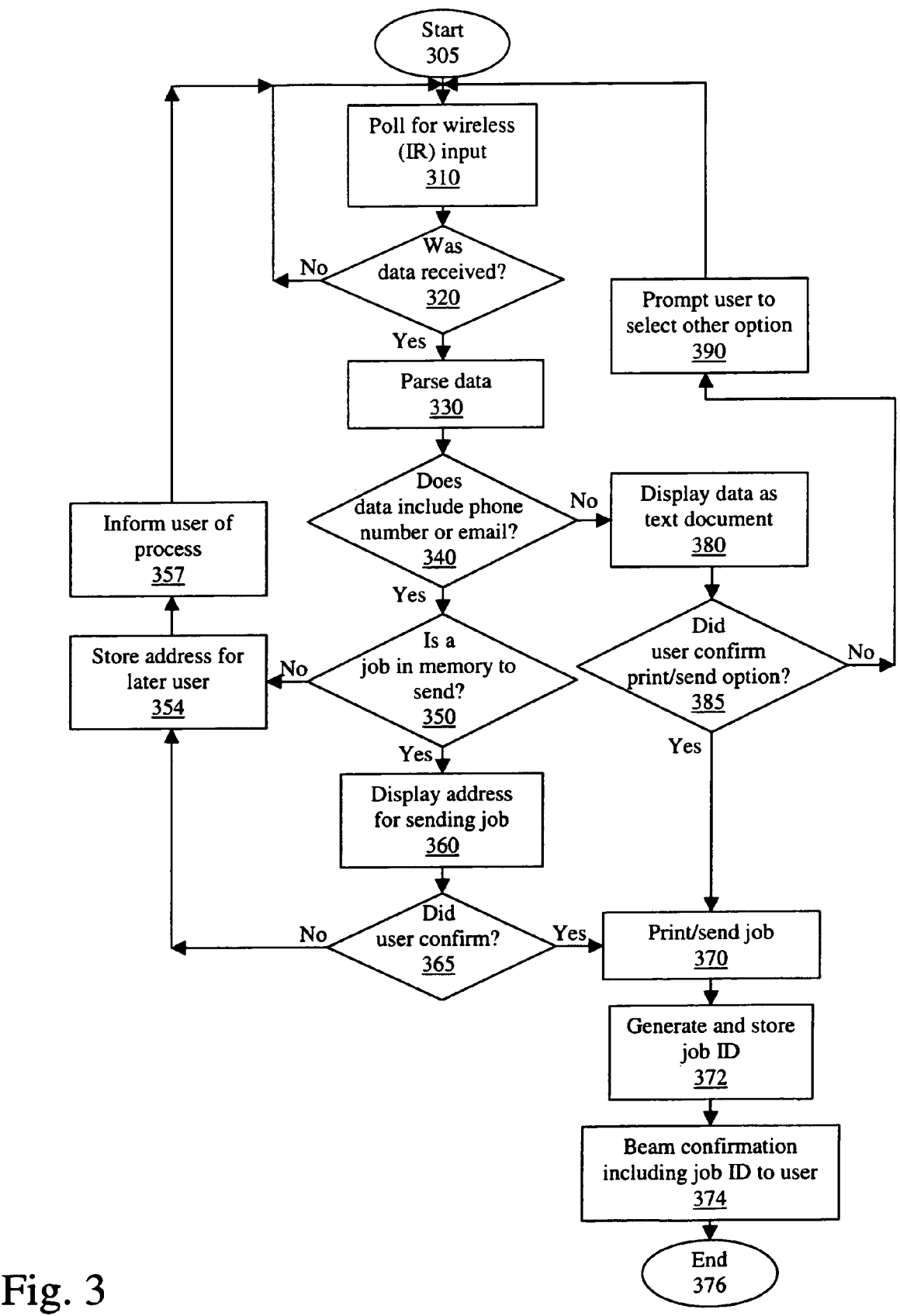
FIG. 3 is a flowchart of one embodiment of the interaction between the communications appliance and a personal digital assistant (PDA).

FIG. 3 is a flowchart of one embodiment of the interaction between the communications appliance and a personal digital assistant (PDA). The process starts at block 305. In one embodiment, the process starts when the system is active and enabled to detect input from a PDA.

At block 310, the process polls to see whether wireless input was received from a PDA. In one embodiment, the wireless input is an infrared beam (IR). In one embodiment, although the term polling is used, the system actually receives an interrupt signal when input is received and is not in a loop.

At block 320, the process determines whether data was received. If data was received, the process continues to block 330. Otherwise, the process returns to block 310.

At block 330, the data received through the wireless input is parsed. The parsing process identifies the components of the data stream received. In one embodiment, the parsing decodes data from the native format of the PDA to a general format. The parser identifies the categories of data that may be present.

At block 340, the process determines whether the data received includes a telephone number or an email address. The parser identifies and appropriately tags such data. If the data was not identified as including a phone number or email address, the process continues to block 380. Otherwise, the process continues to block 350.

At block 380, the data is displayed as a text document. In one embodiment, the display may be on the display of the communications appliance. In another embodiment, the display may use the display on the PDA. At block 385, the user is queried whether he or she wishes to print/send the document. If the user does not wish to do so, the process continues to block 390. At block 390, the user is prompted to select another option. The user may select options from a menu. The process then returns to block 310, to poll for wireless input. The user may make the selection on the user interface of the communications appliance or via the PDA.

If the user confirms the print/send option at block 385, the process continues to block 370. At block 370, the job is printed/sent as appropriate. A confirmation is sent to the PDA at block 375. The process then ends.

If, at block 340, the data was recognized to include a telephone number or email address, the process continues to block 350. At block 350, the process determines whether there is a job in memory to be sent to the destination address selected by the user. If there is a job in memory, the process continues to block 360. Otherwise, the process continues to block 354. At block 354, the address is stored for later use. At block 357, the user is informed that the address was stored, and that if the user wishes to send something to that address he or she may send an item by, for example, placing a document on the platen, in the document feeder, or importing a document from the PDA, and pressing send. Alternatively, the user may in the future send documents to the stored address.

If there was a job in memory at block 350, the process continues to block 360. At block 360, the address is displayed to the user for confirmation. If the user does not confirm, at block 365, the process continues to block 354. If the user confirms that the job should be performed, the process continues to block 370, where the job is sent/printed, as appropriate.

At block 372, the job is assigned a unique identifier. This job ID permits subsequent beaming of confirmation to appliance. Furthermore, this job ID may be used to recall the job for printing, re-sending, re-use of deliver list, etc.

At block 374, confirmation including job ID is beamed back to the user, to indicate that the print/send job was successfully completed. In one embodiment, the process may attach this confirmation to the original document received from the PDA. In an alternative embodiment, the process may insert this confirmation into an appropriate contact management database in the PDA. In another embodiment, the confirmation may be sent to a separate file. In either case, information is sent to the PDA using a PDA-specific data format.

Figure 4A:
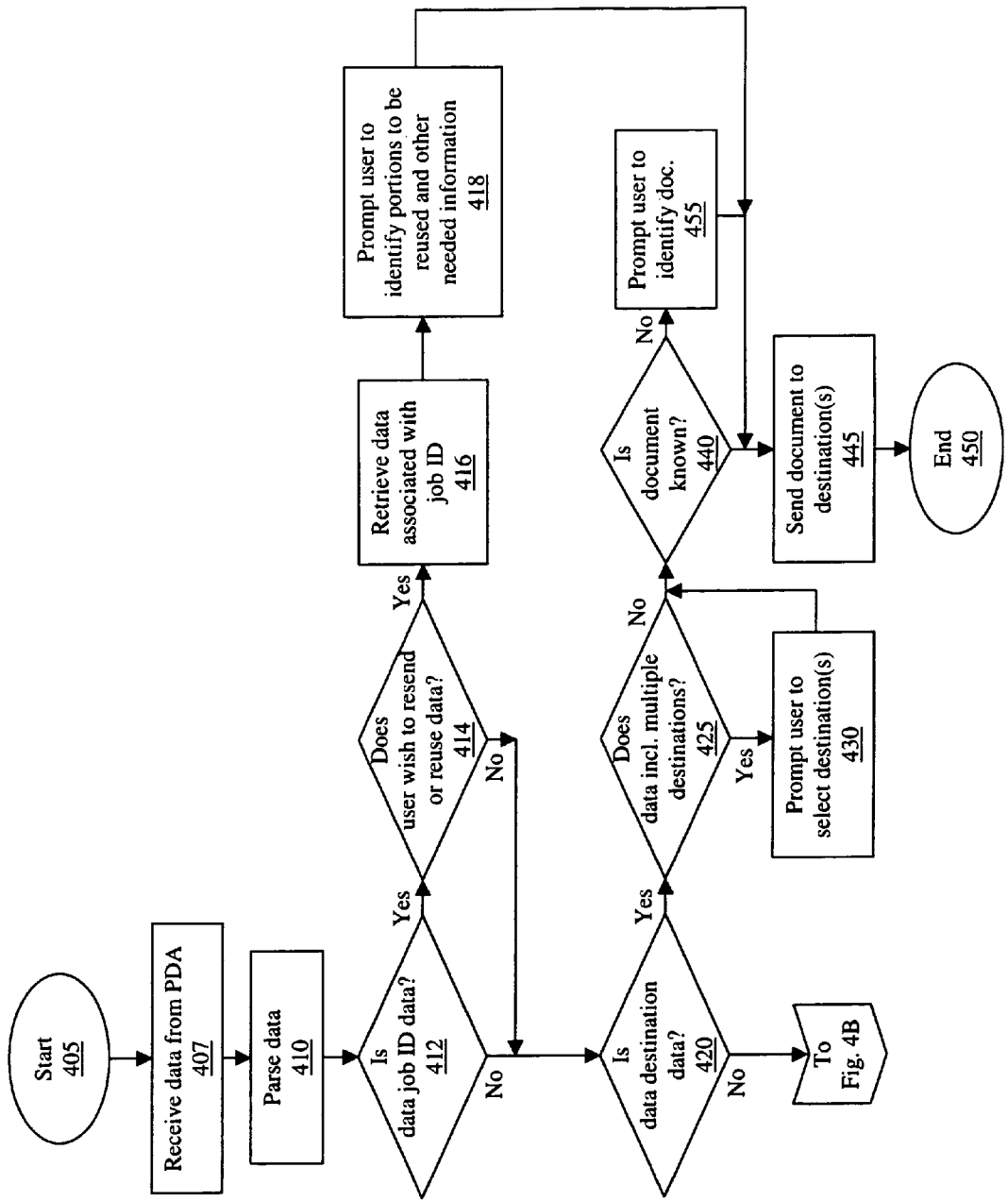
FIGS. 4A and 4B are a flowchart of another embodiment of the interaction between the communications appliance and the PDA.
Figure 4B:
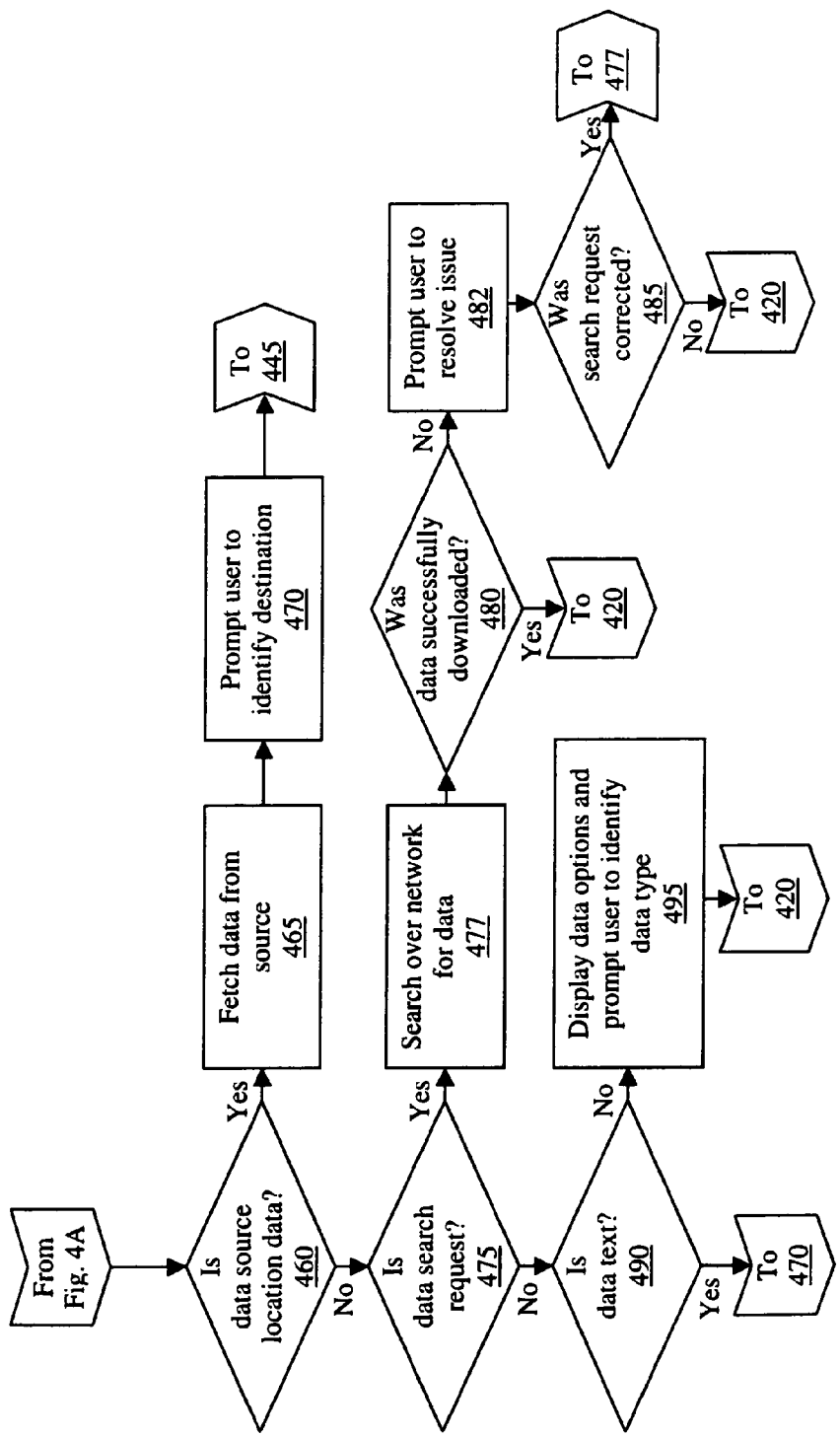

FIGS. 4A and 4B are flowcharts of another embodiment of the interaction between the communications appliance and the PDA. Referring to FIGS. 4A and 4B, the process starts at block 405.

Data is received from the PDA at block 407. In one embodiment, the data may be received via a serial port, such as a socket, via wireless transfer, or through another method. The data is received in the PDA's native format.

At block 410, the data is parsed. The parser takes the data in the PDA's native format, and determines what type of information was transmitted. In one embodiment, the parser identifies the following categories of information:

Job Identification: Identification of previously executed jobs. These identifications generally include destination data, and a pointer to the data that was sent.

Destination Data: e-mail address, fax number, etc.

Source Data: an address from where data should be fetched, HTTP address or address on an internal network Search Request: a) a request to obtain certain data, OR b) incomplete data, e.g. a name without an email address, determined by the parser to be a request to fetch the missing data Data: Other types of data, such as a document, or data for faxing, emailing, copying printing, etc.

The parser identifies the data, and places it in a format that is understood by the communications appliance.

At block 412, the process determines whether the data is job identification (ID) data. If the data is not job ID data, the process continues to block 420. Otherwise, the process continues to block 414.

At block 414, the process queries the user whether the user wishes to resend or otherwise reuse the data identified by the job ID. In one embodiment, the job ID may be embedded in a document, and the user may not wish to use the data associated with the job ID. If the user does not wish to use the data, the process continues to block 420. Otherwise, the process continues to block 416.

At block 416, the data available that is associated with the job ID is retrieved. In one embodiment, the job ID may include the destination(s), what was done with the data, as well as pointers to the data itself. In one embodiment, the data may be stored by the communications appliance when a job is performed. In one embodiment, a subset of this data may be available for any job ID. This data is retrieved, at block 416.

At block 418, the user is prompted to identify portions of the data associated with the job ID that the user wishes to reuse, and to fill in blanks or make the changes as necessary for the new job. For example, the user may be presented with the following display:

Document: Ricoh's Strategy (available)
Destinations: Daja Phillips, Fax: 650-555-1212,
Greg Wolff, e-mail: gwolff@ricoh.com.

The user may be asked to select which of the data to reuse. The user may then, for example, select a new document to be sent to the same destinations, in the same manner, or select to send the same document to new recipients or through new means. In one embodiment, this data may be identified in the data received from the PDA in the manner described below. Thus, for example, the user may send a memo to the PDA that states the following: Fax Job ID# 123456 document to John Hull. This identifies the portion of the job ID data to be used (the document), the destination John Hull), and the means of sending (facsimile). Thus, by parsing the received data, and using the data associated with the job ID, the system can determine who to send the data to.

The process then continues to block 445, where the document is sent to the appropriate destinations(s). The process then ends at block 450.

At block 420, the process determines whether the data is destination data. Destination data may be a fax number, an email address, a certain printer address, or another type of address to which data may be sent. If the data is destination data, the process continues to block 425. Otherwise, the process continues to block 460.

At block 425, the process determines whether the destination data includes multiple destinations. If the destination data includes multiple destinations, the process continues to block 430. Otherwise, the process continues to block 440.

In one embodiment, the destination data may include multiple persons, or a single person having multiple potential destinations. Thus, for example, the destination data may be "Greg Wolff, Fax: 650-555-1212, gwolff@ricoh.com." In this instance, there are multiple potential destinations for the data. Thus, at block 430, the user is prompted to select one of the destinations. The user may, in the alternative select both destinations, in which case Greg would receive two copies of the document, one at each destination address. The destination data may be: "Greg Wolff, fax: 650-555-1212; Daja Phillips, e-mail: dphillips@ricoh.com, Jonathan Hull, pager: 415-555-1111". In this case, the user may chose to select some or all of these destinations, at block 430. The process then continues to block 440.

At block 440, the process determines whether the document to be sent to these selected destinations is known. In one embodiment, documents may be identified concurrently with the destination addresses, may be stored documents in the communications appliance, or may be added after the destination data is known. If the document is known, the process continues to block 445.

At block 445, the document is sent, in the appropriate format, to each of the selected destinations. In one embodiment, the process determines what the appropriate format for the document is, based on the destination data. For example, if a fax number is provided, the data is faxed; if an email address is provided, the data is emailed; if a pager number is provided, the data is transmitted to the pager; etc. The process then ends at block 450. In one embodiment, the process requests a confirmation from the user prior to actually sending any documents. In one embodiment, the process then returns a completion indication to the PDA, after the documents are successfully sent.

If the document is not known at block 440, the process continues to block 455. At block 455, the user is prompted to identify the document to be sent to the destination addresses. In one embodiment, the user may insert a document into the communication appliance, provide a data source location, transmit a document or document location from the PDA, or otherwise indicate to the communications appliance where the document may be obtained. The process then continues to block 445.

If, at block 420, the data was found to not be destination data, the process continues to block 460. In one embodiment, if the data includes destination data and other non-destination data, the process may continue to block 460.

At block 460, the process determines whether the data is source location data. Source location data identifies a source from which data should be obtained.

At block 465, the data is fetched from the source. In one embodiment, the source may be an HTTP address, an IP address of a computer within the network, or a network address. Thus, for example, the source may be "Greg Wolffs computer" on the network, or www.amazon.com, accessed through the Internet.

At block 470, the user is prompted to identify the destination for the data fetched. In one embodiment, the destination may be in the data transmitted from the PDA. In that instance, the process described above with respect to blocks 420-450 would be followed. The process then continues to block 445.

If, at block 460, the data was identified as not being source location data, the process continues to block 475.

At block 475, the process determines if the data is a data search request. In one embodiment, a data search request may be a data that is incomplete. For example, the destination data may include a name, but no fax or email address. In another embodiment, the data search request may be a specified request.

At block 477, the search is performed over the network. In one embodiment, the data is searched in specified locations, such as a company directory and white pages. In one embodiment, the process first searches the company directory, then searches white pages—such as www.switchboard.com, and finally searches yellow pages—such as www.yellowpages.com.

At block 480, the process determines whether the search was successful, resulting in a single answer. If the search was successful, the process continues to block 420, to determine whether the data is destination data or another type of data. If the search was unsuccessful or did not result in a single answer, the process continues to block 482. At block 482, the user is prompted to resolve the issue. For example, if the data search resulted in multiple responses, or resulted in no response at all, the user is asked to select the appropriate answer, or correct the search parameters. The process then continues to bock 485. If the user corrected the search request, the process continues to block 477, to re-execute the search. Otherwise, the process returns to block 420.

If at block 475, the data was not a search request. The process continues to block 490. At block 490, the process determines whether the data is text data. If the data is text data, the process continues to block 470, where the user is prompted to identify a destination for the text.

If the data was not text, the process continues to block 495. At block 495, the data options are displayed to the user, and the user is prompted to select the data type(s) for the data received from the PDA. The process then continues to block 420, with this information.

In one embodiment, the data received from the PDA may include more than one of the data types. The data may be in the form of a data block including multiple data types. Alternatively, the data may include an entry from an address book and a document. Thus, for example, the data may include a destination address as well as the data to be sent to that destination. In that case, the process executes steps 420-495 multiple times, once for each data type. Thus, for example, block 470, where the user is asked to identify destination, may be changed, if the data received from the PDA includes destination data, which was parsed in a previous pass. If the data included destination data, at block 470, the process automatically recognizes that the document destination is known, and proceeds to block 445. Similarly, at block 455, if more unprocessed data is present, the process first determines whether the data includes the document to be sent, prior to prompting the user. In this way, based on a PDA native input, the communications appliance can perform a variety of actions, and use the input appropriately.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of interfacing with a first information device, the method comprising:
   receiving semi-structured data from a second information device in a format native to the second information device;
   parsing the semi-structured data to identify a type of the semi-structured data;
   reformatting the semi-structured data into a format that is understandable by the first information device;
   selecting a type of action to be performed based on the reformatted semi-structured data and the identified type of the semi-structured data, wherein said selecting comprises:
      if the identified type of the semi-structured data is destination type data, performing a first action that sends the reformatted semi-structured data in a job to a destination indicated by the destination type data;
      if the identified type of the semi-structured data is not destination type data, performing a second action that displays the reformatted semi-structured data as a text document on either a display of the first information device or a display of the second information device, and performing a third action that prompts a user indicate whether to send or print the text document as a fourth action; and
      if the identified type of the semi-structured data is source-location data, fetching information from a source indicated by a source-location data and prompting a user to select a destination for the fetched information; or
      if the identified type of the semi-structured data is a search request, fetching information from a search location and prompting a user to select a destination for the search request based on the fetched information.

2. The method of claim 1, wherein the second information device wirelessly transmits the semi-structured data to the first information device, and wherein the first information device is a communication station.

3. The method of claim 1, wherein the first information device is physically coupled to the second information device when receiving the semi-structured data.

4. The method of claim 1, further comprising prompting the user to select a destination, if the destination type data indicates a plurality of destinations.

5. The method of claim 4, wherein the selected destination from the plurality of destinations dictates how the reformatted semi-structured data is to be sent by the first information device.

6. The method of claim 5, wherein said performing comprises e-mailing the reformatted semi-structured data if the selected destination from the plurality of destinations is an e-mail address, and faxing the reformatted semi-structured data if the selected destination from the plurality of destinations is a fax number.

7. The method of claim 1, wherein the selected destination may be one or more of the followings: a destination location associated with a copy feature of the first information device, an e-mail address, and a fax number indicative of a fax location.

8. The method of claim 1, wherein fetching information from the source indicated by the source-location data comprises:
   connecting to a network;
   connecting to the source; and
   downloading the information from the source.

9. The method of claim 1, wherein the search request comprises an incomplete data set.

10. The method of claim 1, wherein fetching information from the search location comprises:
    connecting to a network;
    connecting to a source; and
    downloading the information from the source.

11. An apparatus for sending data from a first information device, the apparatus comprising:
    a communication interface to receive semi-structured data from a second information device in a format native to the second information device;
    a parser to parse the semi-structured data to identify a type of the semi-structured data;
    a data structuring logic to reformat the semi-structured data into a format that is understandable by the first information device, to select a type of action to be performed based on the reformatted semi-structured data and the identified type of the semi-structured data;
    a sending logic to send an action request based on the type of action selected by the data structuring logic, wherein:
       if the identified type of the semi-structured data is destination type data, the action request includes a first action that sends the reformatted semi-structured data in a job to a destination indicated by the destination type data; and
       if the identified type of the semi-structured data is not destination type data, the action request includes a second action that displays the reformatted semi-structured data as a text document on either a display of the first information device or a display of the second information device, and a third action that prompts a user indicate whether to send or print the text document as a fourth action;

a retrieving logic to fetch information from a source indicated by a source-location data if the identified type of the semi-structured data is source-location data; or to fetch information from a search location if the identified type of the semi-structured data is a search request; and a user interface to prompt a user to select a destination for the fetched information if the identified type of the semi-structured data is source-location data; or to prompt the user to select a destination for the search request based on the fetched information if the identified type of the semi-structured data is a search request.

12. The apparatus defined in claim 11, wherein the communication interface receives the semi-structured data wirelessly from the second information device.

13. The apparatus defined in claim 11, wherein the first information device is physically coupled to the second information device when receiving the semi-structured data.

14. The apparatus of claim 11, wherein the user interface prompts a user to select a destination, if the destination type data indicates a plurality of destinations.

15. The apparatus of claim 14, wherein the selected destination from the plurality of destinations dictates how the reformatted semi-structured data is to be sent by the sending logic.

16. The apparatus of claim of claim 15, wherein the sending logic sends an e-mail including the reformatted semi-structured data if the selected destination from the plurality of destinations is an e-mail address, and faxes the reformatted semi-structured data if the selected destination from the plurality of destinations is a fax number.

17. The apparatus of claim 11, wherein the destination may be one or more of the followings: a destination location associated with a copy feature of the first information device, an e-mail address, and a fax number indicative of a fax location.

18. The apparatus of claim 11, wherein the search request comprises an incomplete data set.

19. An article of manufacture having one or more readable storage media storing executable instructions thereof which, when executed by a system, cause the system to perform a method comprising:

receiving semi-structured data from an information device in a format native to the information device;

parsing the semi-structured data to identify a type of the semi-structured data;

reformatting the semi-structured data into a format that is understandable by the system;

selecting a type of action to be performed based on the reformatted semi-structured data and the identified type of the semi-structured data, wherein said selecting comprises:

if the identified type of the semi-structured data is destination type data, performing a first action that sends the reformatted semi-structured data in a job to a destination indicated by the destination type data;

if the identified type of the semi-structured data is not destination type data, performing a second action that displays the reformatted semi-structured data as a text document on either a display of the system or a display of the information device, and performing a third action that prompts a user indicate whether to send or print the text document as a fourth action; and if the identified type of the semi-structured data is source-location data, fetching information from a source indicated by a source-location data and prompting a user to select a destination for the fetched information; or if the identified type of the semi-structured data is a search request, fetching information from a search location and prompting a user to select a destination for the search request based on the fetched information.

20. The article of manufacture of claim 19, wherein the information device wirelessly transmits the semi-structured data to the system, and wherein the system is a communication station.

21. The article of manufacture of claim 19, wherein the system is physically coupled to the information device when receiving the semi-structured data.

22. The article of manufacture of claim 19, further comprising prompting the user to select a destination, if the destination type data indicates a plurality of destinations.

23. The article of manufacture of claim 22, wherein the selected destination from the plurality of destinations dictates how the reformatted semi-structured data is to be sent by the system.

24. The article of manufacture of claim 23, wherein said performing comprises e-mailing the reformatted semi-structured data if the selected destination from the plurality of destinations is an e-mail address, and faxing the reformatted semi-structured data if the selected destination from the plurality of destinations is a fax number indicative of a fax location.

25. The article of manufacture of claim 19, wherein the selected destination may be one or more of the following: a destination location associated with a copy feature of the system, an e-mail address, and a fax number indicative of a fax location.

26. The article of manufacture of claim 19, wherein fetching information from the source indicated by the source-location data comprises:

connecting to a network;
connecting to the source; and
downloading the information from the source.

27. The article of manufacture of claim 19, wherein the search request comprises an incomplete data set.

28. The article of manufacture of claim 19, wherein fetching information from the search location comprises:

connecting to a network;
connecting to a source; and
downloading the information from the source.

29. The method of claim 1, further comprising sending a confirmation to the second information device in the format native to the second information device to indicate completion of one of the first or fourth actions.

30. The apparatus defined in claim 11, further comprising a feedback logic to send a confirmation to the second information device in the format native to the second information device to indicate completion of one of the first or fourth actions.

31. The article of manufacture of claim 19, further comprising sending a confirmation to the second information device in the format native to the second information device to indicate completion of one of the first or fourth actions.

* * * * *